(12) United States Patent
Norvell et al.

(10) Patent No.: US 7,019,794 B2
(45) Date of Patent: Mar. 28, 2006

(54) DETACHABLE VEHICLE MONITOR

(75) Inventors: Gene Norvell, Huntington Park, CA (US); Jack Rochel, Los Angeles, CA (US)

(73) Assignee: Epsilon Electronics, Inc., Commerce, CA (US)

( * ) Notice: Subject to any disclaimer, the term of this patent is extended or adjusted under 35 U.S.C. 154(b) by 515 days.

(21) Appl. No.: 10/281,282

(22) Filed: Oct. 28, 2002

(65) Prior Publication Data
US 2003/0137584 A1 Jul. 24, 2003

Related U.S. Application Data

(60) Provisional application No. 60/330,696, filed on Oct. 29, 2001.

(51) Int. Cl.
*H04N 5/64* (2006.01)

(52) U.S. Cl. .................... 348/838; 297/217.3; 248/918

(58) Field of Classification Search ................ 348/836, 348/838, 61, 837; 725/75–77; 248/917, 248/918; 224/275; 345/7; 362/681, 682, 362/725; 297/217.3, 217.6; 361/681; D14/239, D14/133
See application file for complete search history.

(56) References Cited

U.S. PATENT DOCUMENTS

| | | | | |
|---|---|---|---|---|
| 4,635,110 A * | 1/1987 | Weinblatt | ................... | 348/837 |
| 4,647,980 A * | 3/1987 | Steventon et al. | .......... | 348/837 |
| 5,179,447 A * | 1/1993 | Lain | ........................... | 348/837 |
| 5,288,049 A * | 2/1994 | Hays | ....................... | 248/298.1 |
| 5,359,349 A * | 10/1994 | Jambor et al. | .............. | 345/168 |
| 5,673,628 A * | 10/1997 | Boos | ........................... | 108/44 |
| 5,725,189 A * | 3/1998 | Landy | ..................... | 248/205.2 |
| 5,927,784 A | 7/1999 | Vitito | | |
| 6,075,693 A * | 6/2000 | Leman | ....................... | 361/683 |
| 6,411,505 B1 * | 6/2002 | DiFonzo et al. | ............ | 361/683 |
| 6,698,832 B1 * | 3/2004 | Boudinot | ................ | 297/217.4 |

* cited by examiner

*Primary Examiner*—Victor R. Kostak
(74) *Attorney, Agent, or Firm*—Jacobson Holman PLLC

(57) ABSTRACT

A monitor-housing assembly designed to removably mount a video monitor to facilitate disengaging of the monitor from the vehicle backrest for storage or use in a different location thereby minimizing theft and maximizing monitor utility.

10 Claims, 2 Drawing Sheets

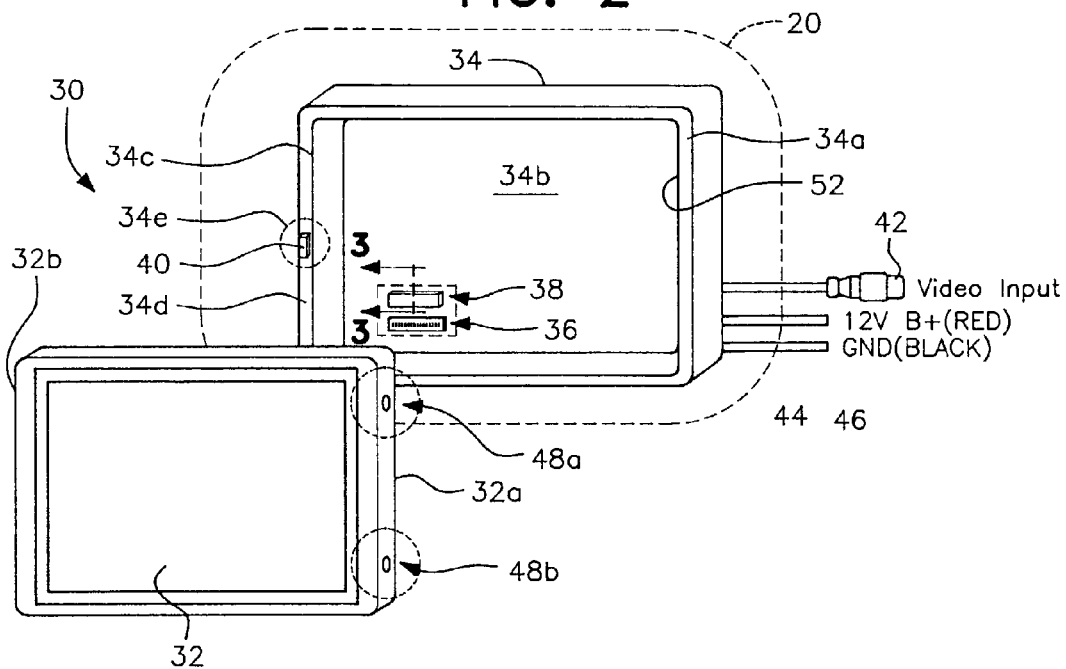
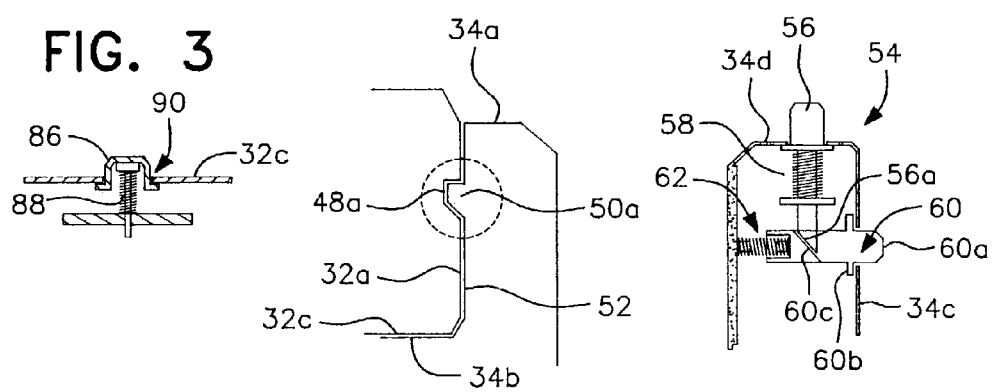
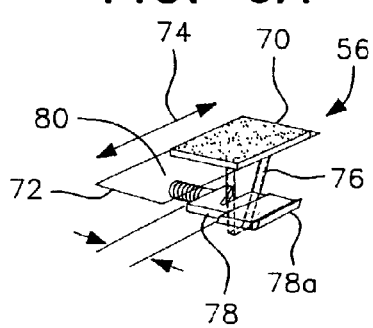
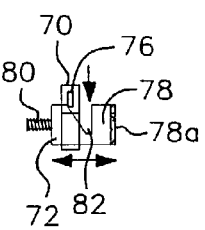
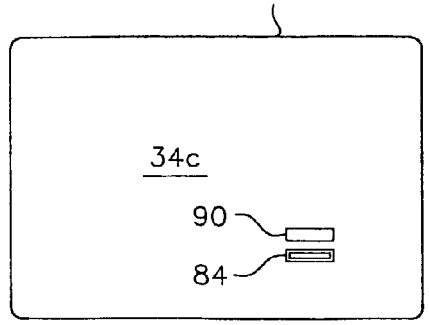

DETACHABLE VEHICLE MONITOR

This application claims priority of U.S. Provisional Application Ser. No. 60/330,696, filed Oct. 29, 2001.

BACKGROUND OF THE INVENTION

1. Field of the Invention

This invention relates to video monitors for vehicles such as automobiles and the like and relates more particularly to a system for removably mounting a video monitor in a fixed base secured in a rear side of a headrest of the vehicle.

2. Description of the Related Prior Art

More frequently vehicles are being designed to accommodate video monitors, such as TFT LCD screens and the like designed to enable passengers to watch television programs, prerecorded tapes or DVDs, or to play video games, or even to access the Internet during a trip. Currently, such video monitors come in different sizes, 5", 5.6", 7", etc., and they may be mounted in the sun visor, the dash or on the ceiling, in a console between the seats of a mini-van, but most commonly are supported behind or in the rear of the headrest of the front seats to entertain or educate passengers seated in the rear seats.

Moreover, such video monitors are often fixed in position in the vehicle, and generally difficult or impossible to remove. Thus, they commonly remain with the vehicle when the driver and passengers leave the vehicle, making them attractive targets for theft.

SUMMARY OF THE INVENTION

It is a primary object of this invention to provide a vehicle monitor which is easy to install in, and remove from, a vehicle for viewing by passengers in the rear seats of the vehicle.

Another object of this invention is to provide a vehicle monitor of the type described which can be temporarily mounted in the headrests on the front seats of a vehicle.

A further object of this invention is the provision of a video monitor-housing assembly which is positionable in the vehicle headrest, providing an interconnection between the monitor and the housing to facilitate quick disconnection of circuitry between the two and easy reconnection of the circuitry.

A still further object of this invention is to provide a monitor-housing assembly designed to removably mount a video monitor to facilitate disengaging of the monitor from the vehicle backrest for storage or use in a different location thereby minimizing theft and maximizing monitor utility.

Yet another object of this invention is to provide a monitor-housing assembly for a video monitor to be used in a vehicle which is simple and inexpensive to manufacture and highly versatile in use.

Other and further objects of this invention will be readily understood by those of ordinary skill in the art with particular reference to the following detailed description of the preferred embodiments in combination wit the accompanying drawings.

BRIEF DESCRIPTION OF THE DRAWINGS

FIG. 2 is another exploded view of the detachable vehicle monitor assembly illustrating recessed portions of the video monitor for receipt of mating projections extending from an interior wall of the housing.

FIG. 3 is a sectional view taken along line 3—3 of FIG. 2.

FIG. 4 is a sectional view of the mating connection between an exterior sidewall of the video monitor and an interior sidewall of the housing.

FIG. 5 is a cross-sectional view of one embodiment of a push-type release button for releasing the video monitor from its housing.

FIG. 6A is another embodiment of the connection between the video monitor and its housing by the use of a slide release switch.

FIG. 6B is a plan view illustrating the operation of the slide release switch shown in FIG. 6A.

FIG. 7 is a rear view of the video monitor illustrating an opening for receipt of a biased bar and an electrical and video signal connector for interconnection with the housing for the video monitor.

Like reference characters refer to like parts throughout the several views of the drawings.

DETAILED DESCRIPTION OF THE PREFERRED EMBODIMENT

Figure 1:
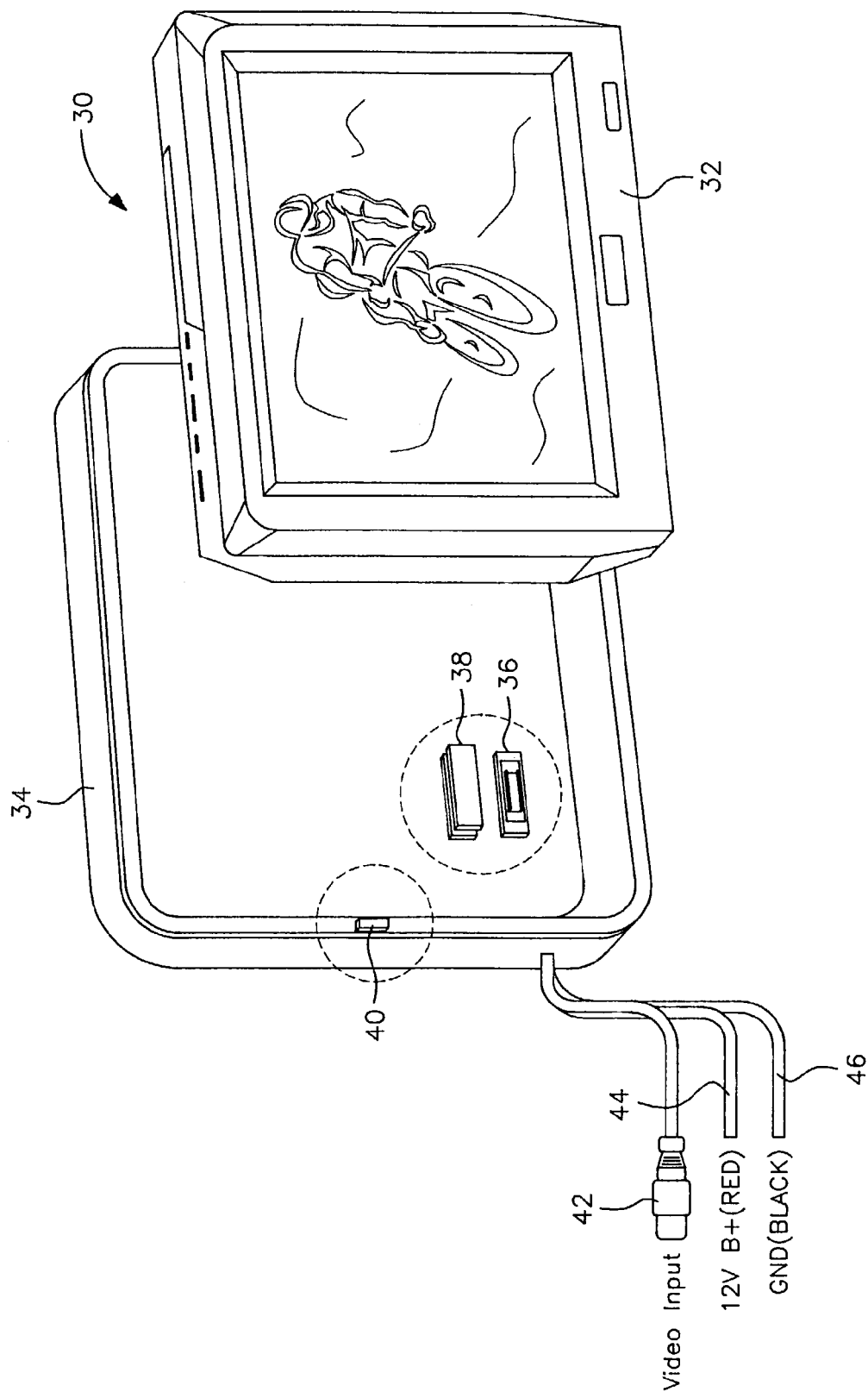
FIG. 1 is an exploded view of one embodiment of a detachable vehicle monitor assembly according to this invention with a housing for receipt of a removably mounted video monitor shown, and the electrical and video connections shown extending from the housing.

The foregoing descriptions and drawing should be considered as illustrative only of the principles of the invention. As noted, the invention may be configured in a variety of shapes and sizes and is not limited by the dimensions of the preferred embodiment. Numerous applications of the present invention will readily occur to those of ordinary skill in the art. Therefore, it is not desired to limit the invention to the preferred embodiments or the exact construction and operation shown and described. Rather, all suitable modifications and equivalents may be resorted to, falling within the scope of the invention.

Referring now to the drawings in general, and particularly to FIGS. 1 and 2, a conventional headrest of a vehicle seat is shown in dotted lines at 20. The nature of the vehicle seat itself or the headrest is not part of the instant inventive concepts. For all intents and purposes, however, substantially every front vehicle seat currently marketed carries a headrest. This invention takes advantage of this relatively universal headrest construction to provide a unique detachable vehicle monitor system.

A detachable vehicle monitor assembly according to this invention is designated generally by the reference numeral 30 in FIG. 1 and is shown as including a video monitor 32. As noted above, video monitors can be used for a variety of purposes. The video input can be fed from a separate DVD or tape player secured under the seat or elsewhere, and can even be received from a computer or the like. Similarly, the power source for the monitor is not a part of the instant inventive concepts and could be a battery of any sort, including the vehicle battery.

According to the preferred embodiment of the instant inventive concepts, the video monitor 32 cooperates with a housing 34 so that the video monitor 32 may removably be fitted in the housing 34. When the video monitor 32 is secured in the housing 34, the video monitor 32 is interconnected with a female electrical I/O port 36 of the housing. The video monitor 32 also cooperates with a biased release mechanism 38 which assists in releasing the video monitor 32 from the housing 34 upon actuation of a release button 40.

When the monitor 32 and housing are engaged, video signals from input 42 are transferred through port 36 to the monitor 32. Similarly, power from leads 44, 46 is transferred to the monitor 32.

For the interconnection of the monitor 32 and housing 34, reference is generally made to FIGS. 2 through 7 which illustrate the preferred interconnections between the monitor 32 and housing 34 as is generally shown in FIG. 2 and is specifically shown in further detail in FIG. 4. A side 32a of the video monitor 32 includes two recesses 48a, 48b. As shown in enlarged detail in FIG. 4, with reference to recess 48a, for example, the recess 48a is engaged by complementary shaped projection 50a projecting inwardly from interior sidewall 52 of housing 34. The sidewall 52 extends downwardly from upper peripheral edge 34a of the housing 34.

Initially, the recesses 48a, 48b in sidewall 32a of the monitor 32 are engaged by the sliding of sidewall 32a of the monitor 32 into the interior of the housing in the direction of interior wall 52 with the monitor being inclined at an angle. After the recesses in sidewall 32a are engaged by the projections in sidewall 52 (represented by projection 50a in FIG. 4) then sidewall 32b is moved into the interior 34b of the housing so as to align sidewall 32b with sidewall 34c of the housing.

Extending from the upper peripheral surface 34d in the encircled area 34e in FIG. 2 is a release switch 40. Release switch 40 may take the form of a push-type release button 54 shown in FIG. 5 or slide release button assembly 56 as shown in FIGS. 6a and 6b. However, these are but exemplary embodiments and the release switch may take many different forms known to those of ordinary skill in the art.

In the embodiment shown at FIG. 5, a push button 56 projects above wall 34d of the housing 34. The button 56 is biased by spring 58 into the position shown in FIG. 5. A cooperating pin 60, extending perpendicular to push button 56, includes projecting portion 60a which extends beyond interior wall 34c of the housing as retained by flange 60b. Pin 60 is biased into the position shown in FIG. 5 by spring 62.

An angled surface 60c of pin 60 engages and cooperates with an angled surface 56a at an opposite end from button 56. Upon depression of button 56, in a direction along its longitudinal axis, inclined surface 56a engages inclined surface 60c to force projecting portion 60a of pin 60 against the bias force of the spring 62 to a position located within the interior of the sidewall of the housing. In this position, side 32b may be moved adjacent to side 34c of the housing so that a corresponding recess (not shown) in sidewall 32b of the monitor 32 is aligned with pin 60. Upon release of button 56, projecting portion 60a will be forced out of the sidewall of the housing and into the corresponding recess of the monitor 32 and sidewall 32b. The cooperation of the projecting portion 60a and the sidewall of the monitor 32 will lock the monitor in place in the interior 34b of the housing 34.

An alternate arrangement of securing the monitor in the housing is shown in FIGS. 6A and 6B. In this embodiment, slide switch 70 is movable in opening 72 in the direction of arrow 74. Extending downwardly from the switch 70 is member 76 which cooperates with a slide member 78, biased by spring 80 to project outwardly from interior sidewall 34c of the housing.

As shown in plan view of FIG. 6B, the member 76 engages the sidewalls of a groove 82 of the slide member 78. Upon sliding of the switch 70 in opening 72, member 76 will engage the sidewalls of the recess 82 and force the slide member 78 rearwardly against the bias of the spring and into the interior of the sidewall of the housing. The monitor 32 may then be lowered into the interior 34b of the housing. Upon movement of the switch 70 in an opposite direction the member 76 will be withdrawn from the groove 82 and by the bias force of spring 80 projecting member 78a will extend into a corresponding recess (not shown) in the sidewall 32b of the monitor.

When the monitor is fit into the interior opening 34b of the housing, male terminal I/O port 84 projecting from the rear surface 32c of the monitor 32 as shown in FIG. 7, will extend into and connect with port 36 on the interior of the housing.

Simultaneously, release mechanism 38 having a bar 86 biased by spring 88 as shown in FIG. 3, will extend into an opening 90 in the rear surface 32c of the monitor. Rear surface 32c will force the bar 86 downwardly against the bias force of the spring 88.

When the monitor is to be removed from the housing, by actuation of either of switch assemblies 54 or 56, the release of engagement of the sidewall 32b of the monitor will release the bias force of spring 88 so as to cause bar 86 to push the monitor 32 out of the interior 34b of the housing. This will slightly elevate or project the monitor out of the housing and facilitate grabbing of end 32b of the monitor. Continued inclination of the monitor will cause release the engagement of recesses 48a, 48b with projections 50a, 50b in sidewall 52 of the housing.

The use and operation of the detachable vehicle monitor assembly of this invention will now be obvious to one of ordinary skill in the art. The video monitor can be readily removed from the monitor assembly for storage or use in another location. The housing of the monitor assembly itself is retained permanently in the headrest.

It will now be seen that this application discloses a detachable vehicle monitor assembly for a video monitor to be used in a vehicle which satisfies all of the foregoing objects, and others, providing many advantages of great practical utility and commercial importance. The foregoing descriptions and drawings should be considered as illustrative only of the principles of the invention. Numerous applications of the present invention will readily occur to those of ordinary skill in the art. Therefore, it is not desired to limit the invention to the preferred embodiments or the exact construction and operation shown and described. Rather, all suitable modifications and equivalents may be resorted to, falling within the scope of the invention.

We claim:

1. An assembly for removably holding a video monitor behind a vehicle seat wherein the vehicle seat includes a headrest, said assembly comprising:

a video monitor, a housing for mounting in the headrest of the vehicle seat, the video monitor and the housing cooperating to hold the video monitor in the housing and have the video monitor be removed from the housing, an electrical connection of the video monitor and an electrical connection of the housing being mutually aligned and removably interconnected between the housing and the video monitor for transfer of power and a video signal from remote sources when the video monitor is located in the housing, and a switch assembly locking the video monitor in the housing for connecting and releasing the video monitor from the housing and separating the electrical connection of the video monitor and the electrical connection of the housing.

2. The assembly as claimed in claim 1, wherein the housing includes a biased push bar for pushing the video monitor out of the housing.

3. The assembly as claimed in claim 2, wherein the video monitor includes an opening for receipt of the push bar.

4. The assembly as claimed in claim 3, wherein the opening is on a rear surface of the video monitor.

5. The assembly as claimed in claim 1, wherein the switch assembly is biased to hold the video monitor in the housing.

6. In combination, an assembly for removably holding a video monitor in a vehicle seat including a headrest, said assembly including
   a video monitor,
   a housing mounted in a rear surface of the headrest of the vehicle seat,
   the video monitor and the housing cooperating to hold the video monitor in the housing and have the video monitor be removed from the housing,
   an electrical connection of the monitor and an electrical connection of the housing being mutually aligned and removably interconnected between the housing and the video monitor for transfer of power and a video signal from remote sources when the video monitor is located in the housing, and
   a switch assembly locking the video monitor in the housing for connecting and releasing the video monitor from the housing and separating the electrical connection of the video monitor and the electrical connection of the housing.

7. The assembly as claimed in claim 6, wherein the housing includes a biased push bar for pushing the video monitor out of the housing.

8. The assembly as claimed in claim 7, wherein the video monitor includes an opening for receipt of the push bar.

9. The assembly as claimed in claim 8, wherein the opening is on a rear surface of the video monitor.

10. The assembly as claimed in claim 6, wherein the switch assembly is biased to hold the video monitor in the housing.

* * * * *